United States Patent [19]
Yanagisawa et al.

[11] Patent Number: 5,391,413
[45] Date of Patent: Feb. 21, 1995

[54] OPTICAL RECORDING MEDIUM

[75] Inventors: Shuichi Yanagisawa; Tatsuro Sakai; Satoru Tanaka; Takashi Chuman; Yasushi Araki; Fumio Matsui, all of Saitama, Japan

[73] Assignee: Pioneer Electronic Corporation, Tokyo, Japan

[21] Appl. No.: 808,623

[22] Filed: Dec. 17, 1991

[30] Foreign Application Priority Data

Jun. 25, 1991 [JP] Japan .................. 3-153386

[51] Int. Cl.⁶ .............................................. B32B 3/00
[52] U.S. Cl. .................................. 428/64; 428/65; 428/457; 428/913; 430/270; 430/945; 346/76 L; 346/135.1; 346/264
[58] Field of Search ............... 428/64, 65, 457, 913; 430/945; 346/76 L, 135.1

[56] References Cited
U.S. PATENT DOCUMENTS

| | | | |
|---|---|---|---|
| 4,412,231 | 10/1983 | Namba et al. | 346/135.1 |
| 4,600,625 | 7/1986 | Abe et al. | 428/167 |
| 4,734,904 | 3/1989 | Imanaka et al. | 369/109 |
| 4,735,889 | 4/1988 | Namba et al. | 430/273 |
| 4,873,131 | 10/1989 | Kashima et al. | 428/64 |
| 4,977,064 | 12/1990 | Sukawa et al. | 430/270 |
| 4,987,021 | 1/1991 | Kanno et al. | 428/64 |
| 4,999,281 | 3/1991 | Inagaki et al. | 430/495 |
| 5,017,414 | 5/1991 | Oregg | 428/64 |
| 5,075,147 | 12/1991 | Usami et al. | 428/64 |
| 5,079,135 | 1/1992 | Matsuzawa et al. | 430/495 |
| 5,080,946 | 4/1992 | Takagasi et al. | 430/270 |

FOREIGN PATENT DOCUMENTS

| | | |
|---|---|---|
| 0319343 | 6/1989 | European Pat. Off. . |
| 3636959 | 5/1987 | Germany . |
| 56-80491 | 7/1981 | Japan . |
| 60-259498 | 12/1985 | Japan . |
| 61-175085 | 8/1986 | Japan . |
| 62-229548 | 10/1987 | Japan . |

OTHER PUBLICATIONS

Patent Abstracts of Japan, vol. 15, No. 149 (P-1190), Apr. 15, 1991 & JP-A-03 022 224 (Fuji Photo Film Co.) Jan. 30, 1990.
Patent Abstracts of Japan, vol. 10, No. 68 (P-437) Mar. 18, 1986 & JP-A-60 205 841 (TDK) Oct. 17. 1985.

*Primary Examiner*—Patrick J. Ryan
*Assistant Examiner*—Elizabeth Evans
*Attorney, Agent, or Firm*—Sughrue, Mion, Zinn, Macpeak & Seas

[57] ABSTRACT

A recordable optical recording medium having sufficiently high reflectance and modulation factor to insure consistent reproduction on CD players. The optical recording medium of the present invention has a light-transparent substrate having pregrooves formed in the face of one surface, a light-absorbing layer formed on the pregrooves, a light-reflecting layer formed on said light-absorbing layer, wherein the pregrooves have a depth of $\lambda/6.5\ n$-$\lambda/2.5\ n$ (where $\lambda$ is the wavelength of recording or reproducing light in nanometers, and $n$ is the refractive index of the substrate) and a width of 0.35–0.47 μm.

4 Claims, 6 Drawing Sheets

OPTICAL RECORDING MEDIUM

BACKGROUND OF THE INVENTION

1. Field of the Invention

The present invention relates to a recordable optical recording medium and, more particularly, to an optical recording medium having a light-absorbing and a light-reflecting layer formed in superposition on a light-transparent substrate.

2. Description of the Related Art

The use of organic dyes, such as cyanine and phthalocyanine dyes, in the recording membrane of recordable optical recording medium is generally known. In order to write information on such optical recording media, a laser beam is focused in a small area of the recording membrane and converted to thermal energy which changes the characteristics of the recording membrane or layer (i.e., forming a pit). The common practice adopted to insure a smooth change in the properties of the recording membrane is to prepare two substrates each bearing a recording membrane and these substrates are combined together with the two recording membranes facing each other, thereby providing a so-called "air sandwich" structure.

The laser beam used to write data on this type of optical recording media can be aimed into the outer face of either transparent substrate so as to form an optically readable pit in either of the recording membranes. In order to reproduce the recorded data, a reading laser beam having a lower power than the writing beam is focused on the pit surface and the contrast between the area where the pit is formed and the area where no pits are formed is read as an electric signal.

Media of the read-only memory (ROM) type having prerecorded data are also available and have been commercially used in audio recording and information processing fields. The ROM media have no recording membrane into which data can be recorded. Stated more specifically, prepits which correspond to the data to be reproduced are already formed on the plastic substrate by press forming with a master. Then, a reflecting layer made of a metal such as Au, Ag, Cu or Al is formed over the prepits, and then a protective layer can be formed on the reflecting layer.

A typical class of ROM media are compact disks which are commonly referred to as CDs. Information is written into and read from CDs with signals of standardized specifications. In accordance with such specifications, CD reproducing apparatus are widely used as compact disk players (CD players).

The recordable optical recording media are the same as CDs insofar as a laser beam is used for reading/writing and that both media are in a disk form. It is strongly desired to develop a recordable medium that complies with the ROM or CD specifications and, as a result, is adapted for use in CD players. However, a problem has been encountered in attempts to achieve this object.

In particular, if the air sandwich structure, which is widely adopted in the conventional recordable media, is merely replaced by the provision of a light-reflecting layer on the conventional recording membrane, the reflectance and modulation factor of a laser beam cannot be made sufficiently high to satisfy the CD specifications.

SUMMARY OF THE INVENTION

An object of the present invention is to provide a recordable optical recording medium that has a sufficiently high reflectance and modulation factor to insure consistent reproduction on CD players.

It has been discovered that this object and other objects of the present invention can be attained by providing an optical recording medium comprising a light-transparent substrate having pregrooves on the flat surface of one side, a light-absorbing layer formed on the side of said substrate where the pregrooves are formed and a light-reflecting layer formed on said light-absorbing layer, wherein said pregrooves have a depth of about $\lambda/6.5$ n to $\lambda/2.5$ n (where $\lambda$ is the wavelength of recording or reproducing light in nanometers, and n is the refractive index of the substrate) and a width of about 0.35–0.47 $\mu$m.

The pregrooves generally have trapezoidal cross-section and their width W is defined by the width in $\mu$m at the position of h/2, i.e. at one half the depth h of grooves.

The light absorbing layer is preferably coated onto the substrate in a thickness of from about 30 to 900 nm, and more preferably 100 to 300 nm.

In another object of the present invention, it is desired to record or reproduce information with light having a wavelength range of about 780–830 nm. Towards this end, a first dye is preferably incorporated in the light-absorbing layer having the following general formula (I):

wherein $R_1$ and $R_2$ are each an alkyl group having 1–8, preferably 3–5, carbon atoms, such as an n-butyl group, for example. $X^-$ is a counter ion such as $ClO_4^-$, $Br^-$, $I^-$ or $Cl^-$, for example.

A second cyanine dye which preferably also is incorporated into the light-absorbing layer together with the first cyanine dye of formula (I) has the following general formula (II):

wherein $R_3$ and $R_4$ are each an alkyl group having 1–8, preferably 3–5, carbon atoms, such as an n-propyl group, for example. $X^-$ represents a counter ion and is be exemplified by the same ions mentioned above for this coefficient.

The second cyanine dye of the general formula (II) is preferably contained in the light absorbing layer in a greater amount than the first cyanine dye of the general formula (I). The preferred weight ratio of the amount of first cyanine dye to the amount of second cyanine dye is in the range of from 1:1.5 to 1:3, respectively, by weight. Also, the concentration of a total mixture of the first and second cyanine dyes in the coating solution used to form the light absorbing layer is preferably in the range of 0.01–0.20 mol/l, with the range of 0.04–0.12 mol/l being more preferred.

In another embodiment of the present invention, a quencher compound is preferably added to the light absorbing layer for the purpose of preventing deterioration of the cyanine dyes upon exposure to light during handling.

The invention itself, both as to its construction and its method of fabrication, together with additional objects and advantages thereof, will be better understood from the following description of preferred embodiments of the present invention when considered in conjunction with the accompanying drawings.

DESCRIPTION OF THE PREFERRED EMBODIMENTS

Figure 1:
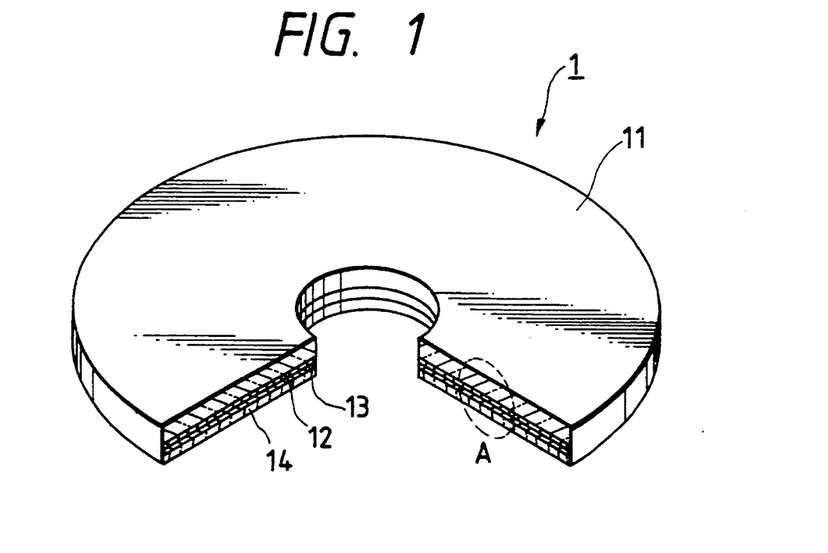
FIG. 1 is a perspective view of a cross-section of the optical recording medium of the present invention.
Figure 2:
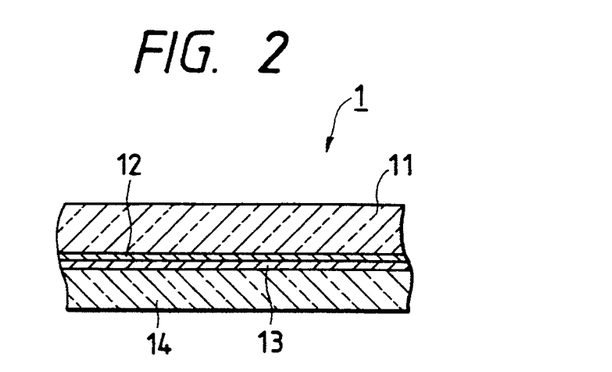
FIG. 2 is an enlarged cross section of the optical recording medium of the present invention.

As shown in FIG. 1, the optical recording medium of the present invention generally comprises a disk-shaped light-transparent substrate 11 that is overlaid with a light-absorbing layer 12, a light-reflecting layer 13 and a protective layer 14, in that sequence.

Figure 3:
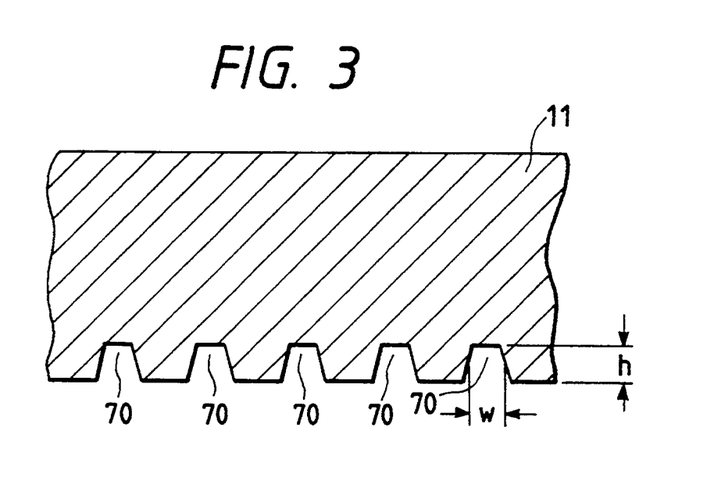
FIG. 3 is a cross section showing the substrate, particularly pregrooves, at an enlarged scale.

As shown in FIG. 3, the light-transparent substrate 11 has tracking pregrooves 70 formed either concentrically or spirally on the flat surface of one side. Pregrooves 70 are formed in such a way as to provide a depth (h) ranging from $\lambda/6.5$ n to $\lambda/2.5$ n, preferably from $\lambda/4.7$ n to $\lambda/3.6$ n, where $\lambda$ is the wavelength of recording or reproducing light in nanometers, and n is the refractive index of the substrate.

If the depth of the pregrooves "h" is less than $\lambda/6.5$ n, disadvantages will occur in that the crosstalk increases whereas the "three-beam" tracking error ($TE_{3b}$), which is necessary to achieve consistent reproduction on CD players, decreases. If the depth of the pregrooves "h" exceeds $\lambda/2.5$ n, the amount of dye that needs to be coated in the grooves increases and, as a consequence, the absorption of light will increase whereas the required reflectance will decrease.

The pregrooves 70 are also formed in such a way as to provide a width W ranging from 0.35 to 0.47 μm, preferably from 0.37 to 0.44 μm. If the groove width W is less than 0.35 μm, the push-pull tracking error ($TE_{pp}$) will decrease and other disadvantages occur such as lower sensitivity and amplitude of recording. If the groove width W exceeds 0.47 μm, the value of $TE_{pp}$ will decrease.

As is clear from FIG. 3, pregrooves 70 usually have a generally trapezoidal cross section. The width W of the pregrooves, as defined for purposes of the present invention, is defined by the width in μm at the position of h/2, i.e. at one half the depth h of grooves.

From the viewpoint of high production rate, the substrate 11 having the pregrooves 70 described above is preferably made of injection-molded resins in which pregrooves are formed integrally. Substrates of this type may be formed from transparent materials such as polycarbonate resins (PC) and polymethyl methacrylate resins (PMMA).

Instead of the injection molding method, the so-called "2P (photopolymer)" method may be adopted to prepare the substrate 11. That is, where the substrate is optical glass having grooves preliminarily formed in a surface, a transfer layer is formed thereover. The transfer layer can be formed of various materials including 2P resins selected from, for example, prepolymers of unsaturated polyesters, epoxy acrylates and urethane acrylates for binder polymers such as polyvinyl, alcohol, polyamides and polymethacrylates, in combination with various acrylate or methacrylate monmers and photopolymerization initiators.

The substrate 11 is typically formed in a thickness of about 1.0–1.5 mm.

The substrate 11 is overlaid with the light-absorbing layer 12 which contains cyanine dyes that provide a recording composition. Among the cyanine dyes that may be used, it is preferred to incorporate a first cyanine dye having a light absorption band in the wavelength region of recording or reproducing light, and a second cyanine dye that has a light absorption band in the wavelength range shorter than said first cyanine dye and that does not show light absorption in the wavelength region of recording or reproducing light.

In the present invention, information is generally recorded or reproduced with light having a wavelength in the range of 770–830 nm.

Therefore, the first dye to be incorporated into the light-absorbing layer 12 according to one preferred embodiment of the present invention can have the following general formula (I):

wherein $R_1$ and $R_2$ are each an alkyl group having 1–8, preferably 3–5, carbon atoms, such as an n-butyl group.

If the number of carbon atoms in $R_1$ or $R_2$ exceeds 8, accelerated deterioration will occur in a test under hot and humid conditions. Furthermore, the dye will become waxy, causing inconvenience in handling.

In the general formula (I), $X^-$ represents a counter ion as exemplified by $ClO_4^-$, $I^-$, $Cl^-$ or $Br^-$.

The second cyanine dye which is also to be incorporated into the light-absorbing layer 12 according to one preferred embodiment can have the following general formula (II):

wherein $R_3$ and $R_4$ are each an alkyl group having 1-8, preferably 3-5, carbon atoms, such as an n-propyl group. If the number of carbon atoms in $R_3$ or $R_4$ exceeds 8, the same disadvantages as described in connection with the general formula (I) will occur.

In the general formula (II), $X^-$ represents a counter ion and may be exemplified by the same ions as already mentioned above in connection with the description of formula (I).

The second cyanine dye of general formula (II) is preferably contained in the light absorbing layer in a greater amount than the amount of the first cyanine dye of general formula (I) and the preferred weight ratio of the first to the second cyanine dye is in the range of from 1:1.5 to 1:3, respectively, by weight. If the second cyanine dye is contained in an amount that is equal to or smaller than the first cyanine dye, it is impossible to achieve the necessary reflectance or another disadvantage will occur in that the thickness of the dye film cannot be selected at such a value as to achieve a good output balance between the push-pull tracking error and the reflectance.

The light-absorbing layer 12 containing the first and second cyanine dyes is coated by a conventional means such as spin coating. To coat this layer, the concentration of a mixture of the first and second cyanine dyes in solution is preferably in the range of 0.01–0.20 mol/l, with the range of 0.04–0.12 mol/l being more preferred. If the concentration of the dye mixture is less than 0.01 mol/l, the light absorption and sensitivity that can be achieved is too low to perform signal recording with a semiconductor laser. If the concentration of the dye mixture exceeds 0.20 mol/l, the dyes will not readily dissolve in solvents.

The light-absorbing layer 12 is coated in a thickness that preferably ranges from 30 to 900 nm, with the range of 100–300 nm being more preferred. If the thickness of the layer 12 is less than 30 nm, the light absorption will decrease so much that the sensitivity of light in the operating wavelength of a semiconductor laser is too low to achieve satisfactory signal recording. If the thickness of the layer 12 exceeds 900 nm, the dye layer becomes so thick so as to cause increased absorption and hence lower reflectance.

Various known solvents can be used for coating the absorption layer 12, as exemplified by diacetone alcohol, ethyl cellosolve, methyl cellosolve, isophornone, methanol, tetrafluropropanol, and the like.

In a still another embodiment of the present invention, a quencher is preferably contained in the light-absorbing layer 12 for the purpose of preventing the deterioration of the cyanine dyes upon exposure to light.

Advantageous examples of the quencher are shown below under (Q-1) to (Q-4):

The light-absorbing layer 12 is overlaid with a light-reflecting layer 13, which is composed of a metal such as Au, Ag, Cu or Al and deposited by a suitable technique such as vacuum evaporation, sputtering or ion plating. The light-reflecting layer 13 preferably has a thickness of about 0.02–2.0 μm.

The light-reflecting layer 13 is usually overlaid with the protective layer 14 for protecting the light-absorbing layer 12 and the light-reflecting layer 13. The protective layer 14 is typically formed by a process that consists of spin coating a uv curable resin and then curing it under exposure to uv radiation. Other materials that can be used to form the protective layer 14 include epoxy resins, acrylic resins, silicone resins and urethane resins. The protective layer 14 typically has a thickness of about 0.1–100 μm.

An intermediate layer may be provided between the substrate 11 and the light absorbing layer 12 in order to protect the substrate 11 from the coating solvent. If necessary, an intermediate layer may be provided between the light-absorbing layer 12 and the light-reflecting layer 13 in order to enhance the efficiency of light absorption.

Recording light in pulsed form is applied to the optical recording medium of the present invention as it generally rotates, whereupon part of the light-absorbing layer 12 is melted away to form a pit. To reproduce the recorded data, reading light is applied to the medium as it rotates and the difference is detected between the intensity of the light reflected from the area where the pit is formed and that of the light reflected from the area no pits are formed.

The present invention is described below in greater detail by reference to the following nonlimiting examples.

EXAMPLES

In order to investigate the effect of the width W of the pregrooves, substrate samples (polycarbonate disks with a diameter of 120 mm and a thickness of 1.2 mm) having grooves of various widths (see Table 1) were fabricated.

With samples of the greater band number, grooves were located closer to the periphery of the substrate.

TABLE 1

| Band No. | Groove Width (μm) |
| --- | --- |
| 3 | 0.18 |
| 4 | 0.27 |
| 5 | 0.28 |
| 6 | 0.31 |
| 7 | 0.34 |
| 8 | 0.35 |
| 9 | 0.39 |
| 10 | 0.44 |
| 11 | 0.47 |
| 12 | 0.50 |

TABLE 1-continued

| Band No. | Groove Width (μm) |
| --- | --- |
| 13 | 0.54 |
| 14 | 0.57 |
| 15 | 0.59 |

As already mentioned herein, the width W of the pregrooves is defined as the width (μm) measured at the position of h/2, i.e. at one half the depth h of the grooves. Groove width W and groove depth h were measured with a coordinate measuring scanning electron microscope, Model EMM-3000 of Erionicks Co., Ltd.

A light-absorbing layer containing two cyanine dyes was coated on the grooved surface of each substrate. Dyes (D-1) and (D-2) identified below were used as the first and second cyanine dyes, respectively, to be contained in the light-absorbing layer.

Each of these dyes were dissolved in ethyl cellosolve and the solution was coated in a thickness of 250 nm onto the substrate. The mixing weight ratio of the first to the second cyanine dye was 1:3, respectively, by weight, and the concentration of the mixture of the two cyanine dyes in solution was adjusted to 0.085 mol/l (0.018 mol/l of the first cyanine dye and 0.067 mol/l of the second cyanine dye).

A gold (Au) light-reflecting layer was deposited in a thickness of 0.1 μm on the light-absorbing layer by vacuum evaporation. A photopolymer protective film was provided on the light-reflecting layer. By this basic procedure, various samples of optical recording medium were fabricated.

First cyanine dye (D-1)

Figure 12:
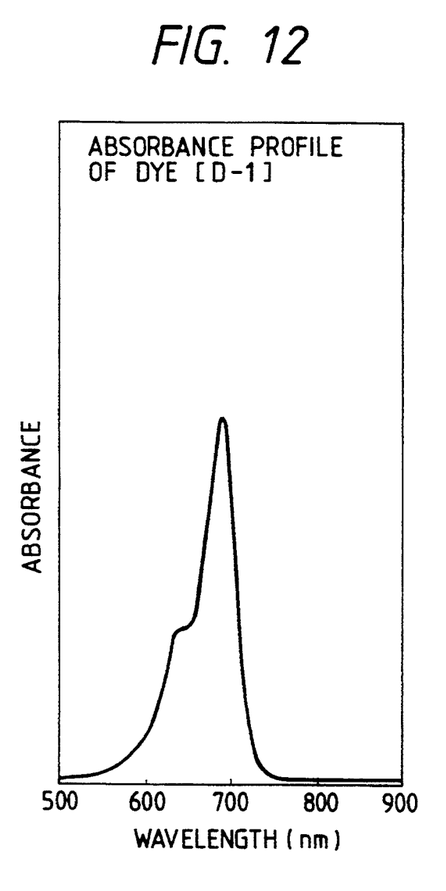
FIG. 12 is a graph showing the absorption characteristic of the first cyanine dye (D-1), described herein.

Dye of the general formula (I) where $R_1$ and $R_2$ are each n-$C_4H_9$ and $X^-$ is $ClO_4^-$. The absorbance characteristic of this dye is shown in FIG. 12, from which one can see that the dye has a light absorption band at 580–720 nm.

Second cyanine dye (D-2)

Figure 13:
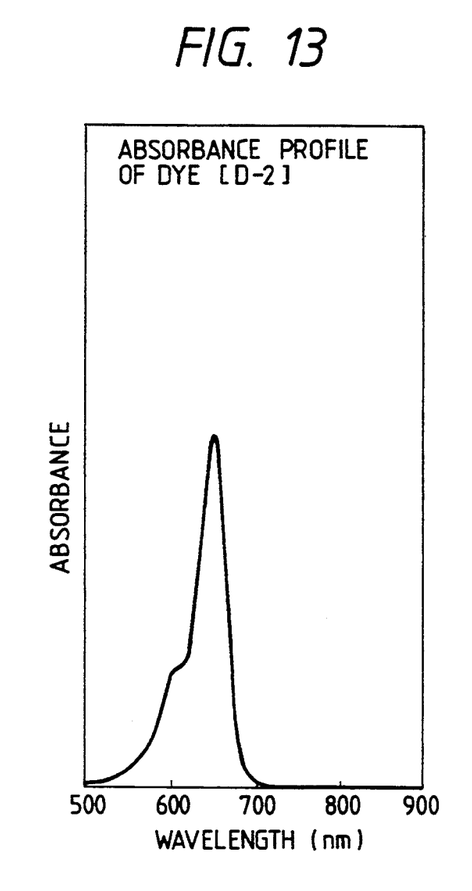
FIG. 13 is a graph showing the absorption characteristic of the second cyanine dye (D-2), described herein.

Dye of the general formula (II) where $R_3$ and $R_4$ are each n-$C_3H_7$ and $X^-$ is $ClO_4^-$. The absorbance characteristic of this dye is shown in FIG. 13, from which one can see that the dye has a light absorption band at 540–680 nm.

EFM signals were recorded and reproduced from the respective media samples under the following conditions.

EFM signal record/reproduce conditions
 Wavelength: 778 nm
 Linear speed: 1.4 m/s
 Write power: 6.0 mW
 Read power: 0.5 mW For each of the media with which recording was conducted under the conditions specified above, the following seven potentials were measured: potential in the land, $I_l$; potential in the groove, $I_g$; potential in the brightest portion of recorded signals that had an amplitude of 11 T (196 kHz), $I_{top}$; potential of recorded signals that has an amplitude of 11 T (196 kHz), $I_{11T}$; potential of recorded signals that had an amplitude of 3 T (720 kHz), $I_{3T}$; push-pull tracking error potential, $TE_{pp}$; and a three-beam tracking error potential, $TE_{3b}$.

Figure 4:
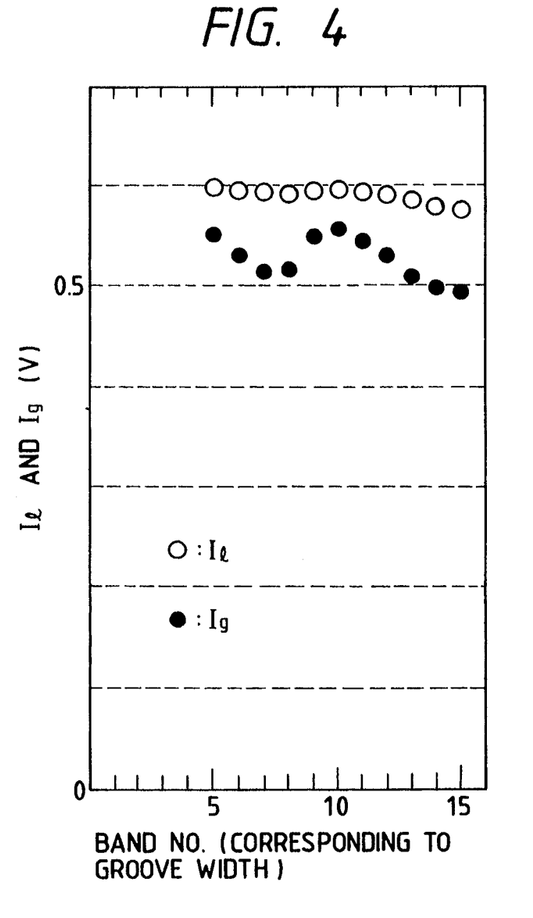
FIG. 4 is a graph showing the profiles of land potential $I_l$ and groove potential $I_g$.
Figure 5:
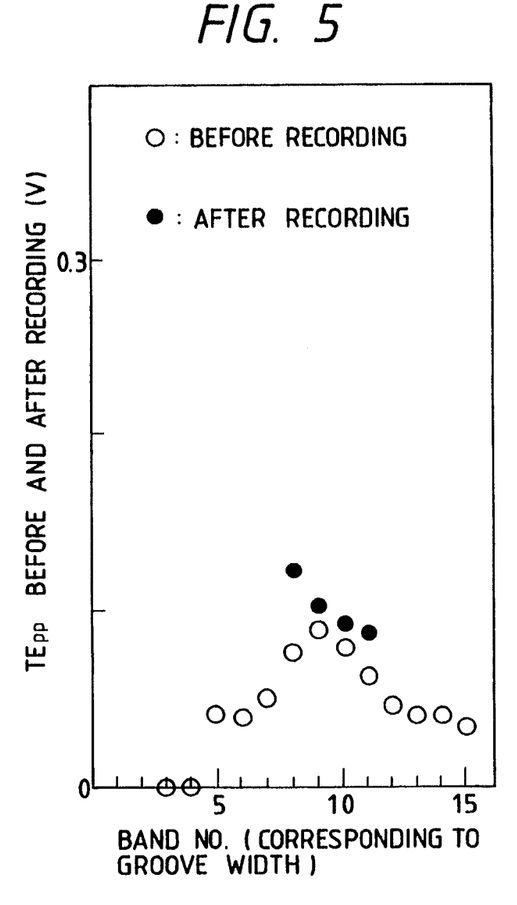
FIG. 5 is a graph showing the profiles of push-pull tracking error potential $TE_{pp}$ before and after recording.
Figure 6:
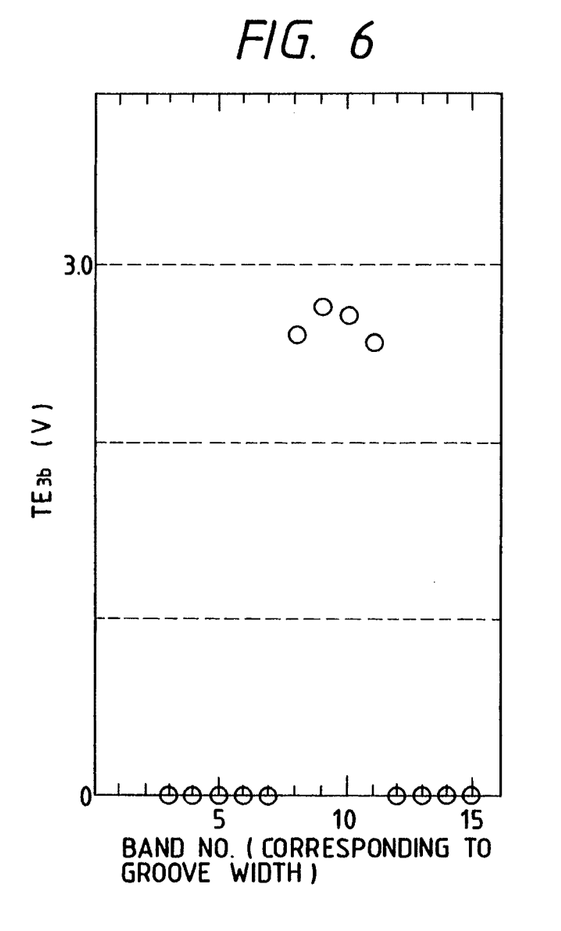
FIG. 6 is a graph showing the potential of three-beam tracking error potential $TE_{3b}$.
Figure 7:
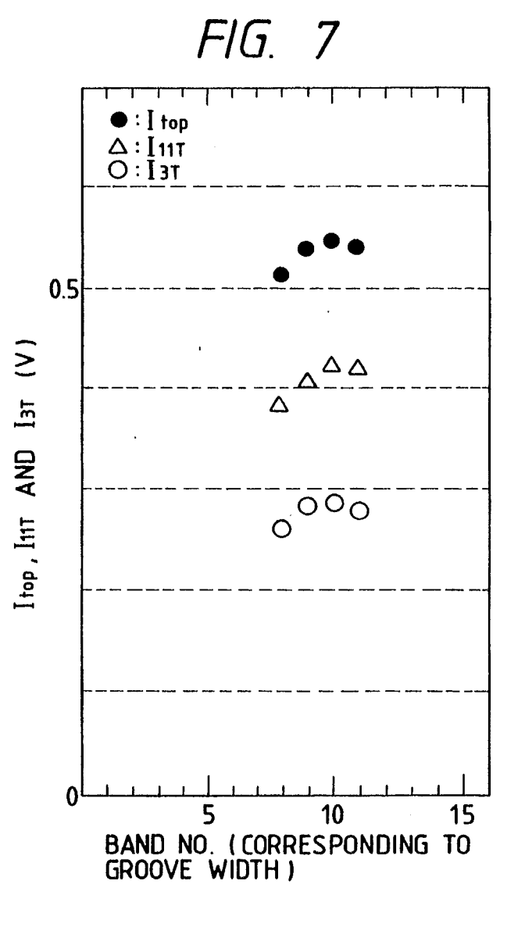
FIG. 7 is a graph showing the potential profiles of $I_{top}$, $I_{11T}$ and $I_{3T}$.

The results of potential measurements are shown in FIGS. 4–7. FIG. 4 is a graph showing the profiles of land potential $I_l$ and groove potential $I_g$; FIG. 5 is a graph showing the profiles of push-pull tracking error potential $TE_{pp}$ before and after the recording; FIG. 6 is a graph showing the profile of three-beam tracking error potential $TE_{3b}$; and FIG. 7 is a graph showing the profiles of $I_{top}$, $I_{11T}$ and $I_{3T}$.

Evaluating the respective samples on the basis of the results shown in the graphs in FIGS. 4–7, one can see that the following conditions should be satisfied in order to reproduce signals in accordance with the CD format:

(1) $I_l > I_g$;

(2) push-pull tracking error $TE_{pp}$ must be at least 0.04 V in order to perform tracking servo control in a consistent manner and to thereby insure reliable recording;

(3) the three-beam tracking error potential $TE_{3b}$ must be at least 2.5 V which is comparable to the $TE_{3b}$ of commercial CDs and this is in order to insure that recorded signals (pits) are reproduced in a consistent manner on CD players; and (4) since a reflectance of at least 65% is necessary, $I_{top}$ must be at least 0.45 V under the conditions for recording and reproduction set forth above and, at the same time, $I_{11T}/I_{top}$ must be at least 60% whereas $I_{3T}/I_{top}$ must be in the range of 30–70% in order to insure adequate reflectance and high modulation factor.

The graphs in FIGS. 4–7 show that all of these conditions for evaluation were satisfied by Band Nos. 8–11 (groove width W=0.35–0.47 μm).

Then, with the width W of the pregrooves on the substrate being fixed at 0.44 μm and the wavelenghth λ is 778 nm, the depth h of the grooves was varied over the range of from λ/7.0 n to λ/3.8 n in angstroms (Å) in order to investigate the effect of groove depth h.

In preparing the samples of optical recording media, the light-absorbing layer, the light-reflecting layer and the protective layer were of the same type as those used in investigating the effect of groove width W.

Figure 8:
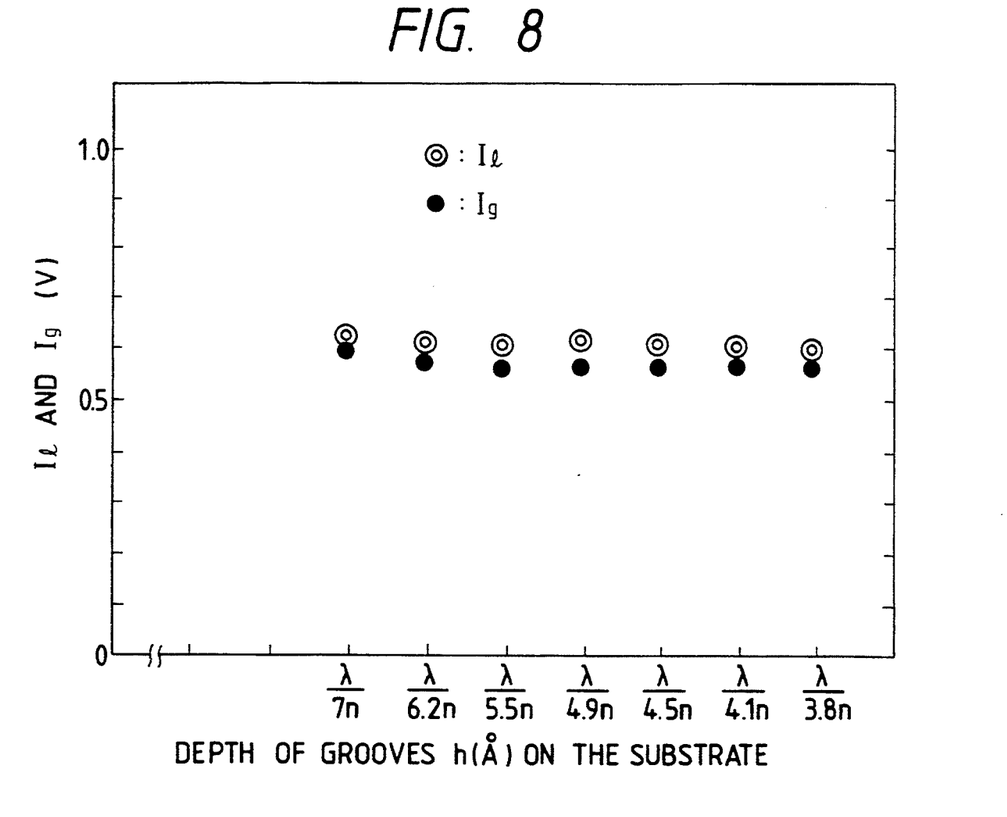
FIG. 8 is a graph showing the profiles of land potential $I_l$ and groove potential $I_g$.
Figure 9:
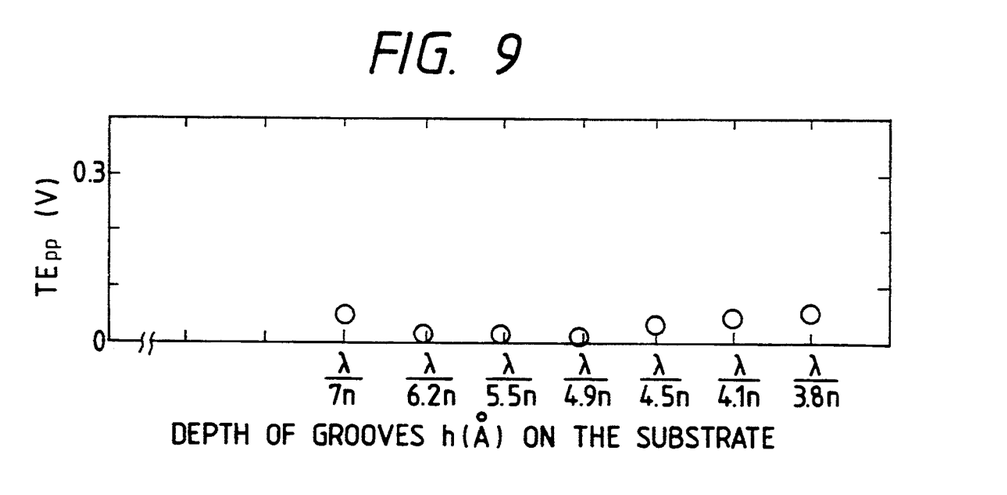
FIG. 9 is a graph showing the profile of push-pull tracking error potential $TE_{pp}$.
Figure 10:
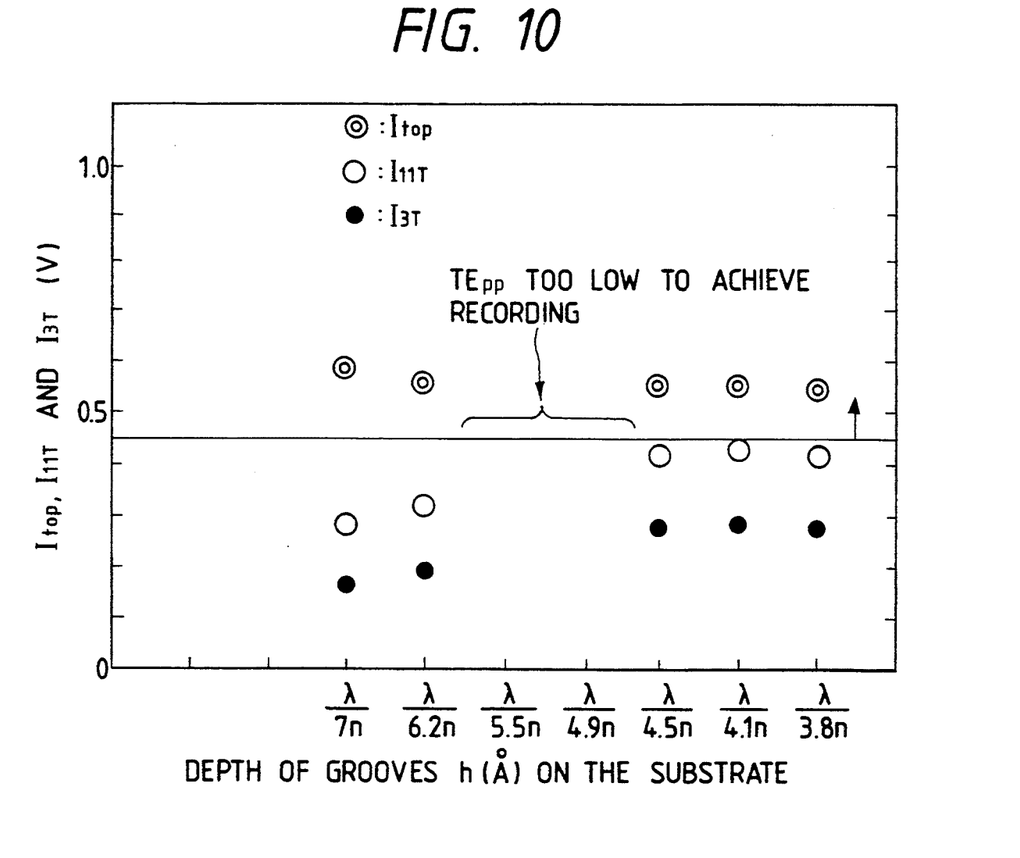
FIG. 10 is a graph showing the potential of $I_{top}$, $I_{11T}$ and $I_{3T}$.
Figure 11:
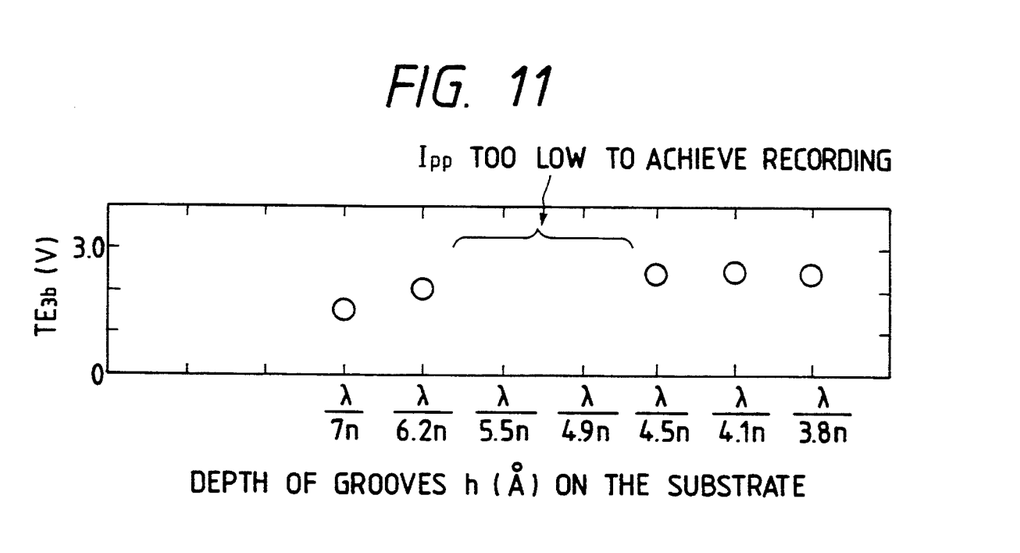
FIG. 11 is a graph showing the profile of three-beam tracking error potential $TE_{3b}$.

The results of measurements are shown in FIGS. 8–11; FIG. 8 is a graph showing the profiles of specular potential $I_O$ and groove potential $I_g$ (the relation of $I_O > I_g$ must be satisfied); FIG. 9 is a graph showing the profile of push-pull tracking error potential $TE_{pp}$; FIG. 10 is a graph showing the profiles of $I_{top}$, $I_{11T}$ and $I_{3T}$; and FIG. 11 is a graph showing the profile of three-beam tracking error potential $TE_{3b}$.

The graphs in FIGS. 8–11 show that at the fixed groove width W of 0.44 μm, all of the aforementioned conditions for evaluation were satisfied by the samples where the depth h of the grooves was within the range of λ/4.5 n-λ/3.8 n (where λ is the wavelength of recording or reproducing light in nanometers, and n is the refractive index of the substrate).

A similar experiment was conducted with the groove width W being varied from 0.35 to 0.47 μm and the wavelength λ=778 nm and it was verified that satisfactory results could be obtained over the depth (h) range of λ/6.5 n to λ/2.5 n.

As is apparent from the foregoing description, the optical recording medium of the present invention provides a recordable optical recording medium that has a sufficiently high reflectance and modulation factor to insure consistent reproduction on commercial CD players.

While the invention has been described in detail and with reference to specific embodiments thereof, it will be apparent to one skilled in the art that various changes and modifications can be made therein without departing from the spirit and scope thereof.

What is claimed is:

1. An optical recording medium comprising a light-transparent substrate including pregrooves formed in a surface of said substrate, a light-absorbing layer having a thickness of about 30 to 900 nm formed on said pregrooves, and a light-reflecting layer formed on said light-absorbing layer, wherein said pregrooves have a depth of from about λ/6.5 n to λ/2.5 n, wherein λ is the wavelength of recording or reproducing light in nanometers and n is the refractive index of the substrate, and wherein said pregrooves further have a width of from about 0.35 to 0.47 μm, wherein said light-absorbing layer contains a first cyanine dye represented by the following general formula (I):

wherein $R_1$ and $R_2$ are each an alkyl group having 1-8 carbon atoms, and $X^-$ is a counter ion, and a second cyanine dye represented by the following general formula (II):

wherein $R_3$ and $R_4$ are each an alkyl group having 1-8 carbon atoms, and $X^-$ is a counter ion, and wherein information is recorded or reproduced in said light-absorbing layer in a wavelength region of about 780–830 nm.

2. An optical recording medium according to claim 1, wherein said first cyanine dye and said second cyanine dye are present in said light-absorbing layer in a weight ratio of from 1:1.5 to 1:3, respectively, by weight.

3. An optical recording medium according to claim 1, wherein $R_1$ and $R_2$ each represent n-$C_4C_9$ in formula (I), and $R_3$ and $R_4$ each represent n-$C_3C_7$ in formula (II), and $X^-$ represents $ClO_4^-$ for each of formula (I) and formula (II).

4. An optical recording medium according to claim 1, wherein said pregrooves have a depth of from λ/4.7 n to λ/3.6 n and a width of from 0.37 μm to 0.45 μm.

* * * * *